(12) United States Patent
Freed et al.

(10) Patent No.: US 11,707,012 B2
(45) Date of Patent: Jul. 25, 2023

(54) ROW CLEANER FOR AGRICULTURAL SEEDER

(71) Applicant: Ag Focus, LLC, Lexington, IL (US)

(72) Inventors: Bruce W. Freed, Lexington, IL (US); Brian E. Freed, Lexington, IL (US)

(73) Assignee: AGFOCUS LLC, Lexington, IL (US)

( * ) Notice: Subject to any disclaimer, the term of this patent is extended or adjusted under 35 U.S.C. 154(b) by 465 days.

(21) Appl. No.: 16/870,935

(22) Filed: May 9, 2020

(65) Prior Publication Data

US 2020/0352085 A1 Nov. 12, 2020

Related U.S. Application Data

(60) Provisional application No. 62/846,533, filed on May 10, 2019.

(51) Int. Cl.
*A01C 5/06* (2006.01)
*A01C 7/00* (2006.01)

(52) U.S. Cl.
CPC .............. *A01C 5/064* (2013.01); *A01C 7/006* (2013.01)

(58) Field of Classification Search
CPC ......... A01C 5/064; A01C 7/006; A01C 5/062; A01B 61/048; A47L 5/28; A61M 5/3275
USPC ........................................................ 111/157
See application file for complete search history.

(56) References Cited

U.S. PATENT DOCUMENTS

| | | | |
|---|---|---|---|
| 2,996,312 A * | 8/1961 | Paul ................... | B62D 53/0807 280/439 |
| 5,461,995 A | 10/1995 | Winterton | |
| 7,673,570 B1 | 3/2010 | Bassett | |
| 8,910,581 B2 * | 12/2014 | Bassett ................. | A01C 7/208 111/194 |
| 9,148,989 B2 * | 10/2015 | Van Buskirk .......... | A01C 5/066 |
| 2009/0301367 A1 * | 12/2009 | Martin ................... | A01C 7/208 111/139 |
| 2010/0000451 A1 | 1/2010 | Martin | |
| 2011/0247537 A1 | 10/2011 | Freed | |
| 2012/0261149 A1 * | 10/2012 | Schmidt ................ | A01C 7/006 172/558 |
| 2017/0000001 A1 * | 1/2017 | Freed ..................... | A01B 35/28 |
| 2018/0266078 A1 * | 9/2018 | Freed ..................... | E02F 9/205 |
| 2022/0210962 A1 * | 7/2022 | Martin ................... | A01B 49/02 |

FOREIGN PATENT DOCUMENTS

EP         1031265 A1     8/2000

* cited by examiner

*Primary Examiner* — Octavia Davis Hollington
(74) *Attorney, Agent, or Firm* — William H. Honaker; Dickinson Wright PLLC

(57) ABSTRACT

The present invention is a row cleaning device having a main body with a proximal end and a distal end, the main body proximal end is adapted to mount to a seeder. A pivot leg has a first end and a second end, the first end is pivotally mounted to the main body distal end at a pivot, the second end extends toward the main body proximal end. A clearing implement is mounted to the pivot leg second end and rotates with respect to the pivot leg. The row cleaning device is adapted to be driven by a seeder in a direction of travel with the clearing implement being located behind the pivot in the direction of travel. The pivot leg pivots with respect to the main body as the clearing implement moves along the ground in the direction of travel.

28 Claims, 5 Drawing Sheets

ROW CLEANER FOR AGRICULTURAL SEEDER

CROSS-REFERENCE TO RELATED APPLICATION

This application claims the benefit of U.S. Provisional Application No. 62/846,533 filed on May 10, 2019, which is incorporated herein by reference in its entirety.

TECHNICAL FIELD

This invention relates generally to agricultural seeders such as for example a John Deere 1890 seeder. More specifically, it relates to a row cleaner which can be attached to a standard seeder and even more specifically attached to either the tool bar or the implement.

BACKGROUND OF THE INVENTION

Seeders of the present invention are typically no-till seeders. Because they are no-till, there is residue left in the field that can interfere with the seeders' operation. Therefore, it is important to clear the rows of residue prior to seeding. This has been a problem since space is limited with seeders, and adding a row cleaner is difficult.

An attempt to provide a row cleaner on a seeder has been done by others. Yetter and Aricks have made seeder row cleaners. Each of these row cleaners is mounted forward of the seeder and are mounted to the seeder unit. Each is a push type row cleaner. The push type is required to fit the system in the limited space available on the seeder. The row cleaner blades are mounted on an arm that extends in the direction of travel. The row cleaner is pivotally mounted upon a bracket and can pivot vertically during operation. However, because the row cleaner is being pushed instead of pulled, it has the tendency to dig into the ground and create gouges and affect the overall operation of the seeder equipment. The plowing into the ground is so severe that each of these row cleaners has to have a chain or cable attached between the pivot arm and the tool bar to prevent over extension and resultant catastrophic damage to the equipment. Without the cable or chain, the blades can dig into the ground and the arm and blades can be twisted or even torn off the unit. This creates considerable downtime to repair or replace the damaged cleaners.

Another problem with known cleaners for seeders is the long distance between the ground cleaning contact of the blade and the seed drop. Due to the blade being in front of the pivot point, there is a long distance between the blade and where the seed is dropped. This results in residue entering the seed trench. As the blades are cutting through residue, the residue becomes airborne and can enter the seed trench. As is well known, seed drills are closely spaced with respect to one another which results in the seed trenches being very close and susceptible to residue entering the trenches. Residue in the seed trenches can create hair pinning which results in bad seed emergence.

The known seed row cleaners are also difficult to bring to the rest position, or raised up and taken off of the ground. Known seed row cleaners are normally in the down position, in contact with the ground. In the event the operator wants to raise them, it must be done manually. For example, in wet areas of the field, it is desirable to have the row cleaners raised. To raise them, the operator has to leave the tractor and manually raise the row cleaners to the up position and lock them in place. This is very time consuming and laborious.

A still further problem with known row cleaners is the need for an air cylinder to provide the downforce required to force the blades into contact with the ground and residue. Air cylinders have internal seals that are susceptible to heat and dust which can cause failure. They are also slow to react.

What is needed is a row cleaner that can be mounted to standard seeders. The row cleaner would be capable of mounting to the toolbar or to the unit directly. The row cleaner blade would be a pull type row cleaner. In this way, if the row cleaner blade were to encounter any obstructions, it would move vertically, but at the same time be pulled over the obstruction instead of plowing into the obstruction. This would increase the row cleaner's life and not adversely affect the operation of the row seeder itself. It is also desirable to have the cutting blade closer to the seed drop to reduce or eliminate hair pinning. It would also be desirable to have a row cleaner that is easier to raise when the operator wants the row cleaner in the rest or up position.

SUMMARY OF THE INVENTION

The present invention is a row cleaning device which has a main body with a proximal end and a distal end, the main body proximal end is adapted to mount to a seeder. A pivot leg has a first end and a second end, the first end is pivotally mounted to the main body distal end at a pivot. The second end extends toward the main body proximal end. A clearing implement, such as a wheel is mounted to the pivot leg second end and rotates with respect the pivot leg. The row cleaning device is adapted to be driven by a seeder in a direction of travel with the clearing implement being located behind the pivot in the direction of travel. The pivot leg pivots with respect to the main body as the clearing implement moves along the ground in the direction of travel.

The row cleaning device of the present invention also uses an air or hydraulic spring. The spring allows for remote control of the cleaning device. It is also not susceptible to the disadvantages of air or hydraulic cylinders.

These and other features and advantages of this invention will become more apparent to those skilled in the art from the detailed description of a preferred embodiment. The drawings that accompany the detailed description are described below.

DETAILED DESCRIPTION OF THE PREFERRED EMBODIMENT

Figure 1:
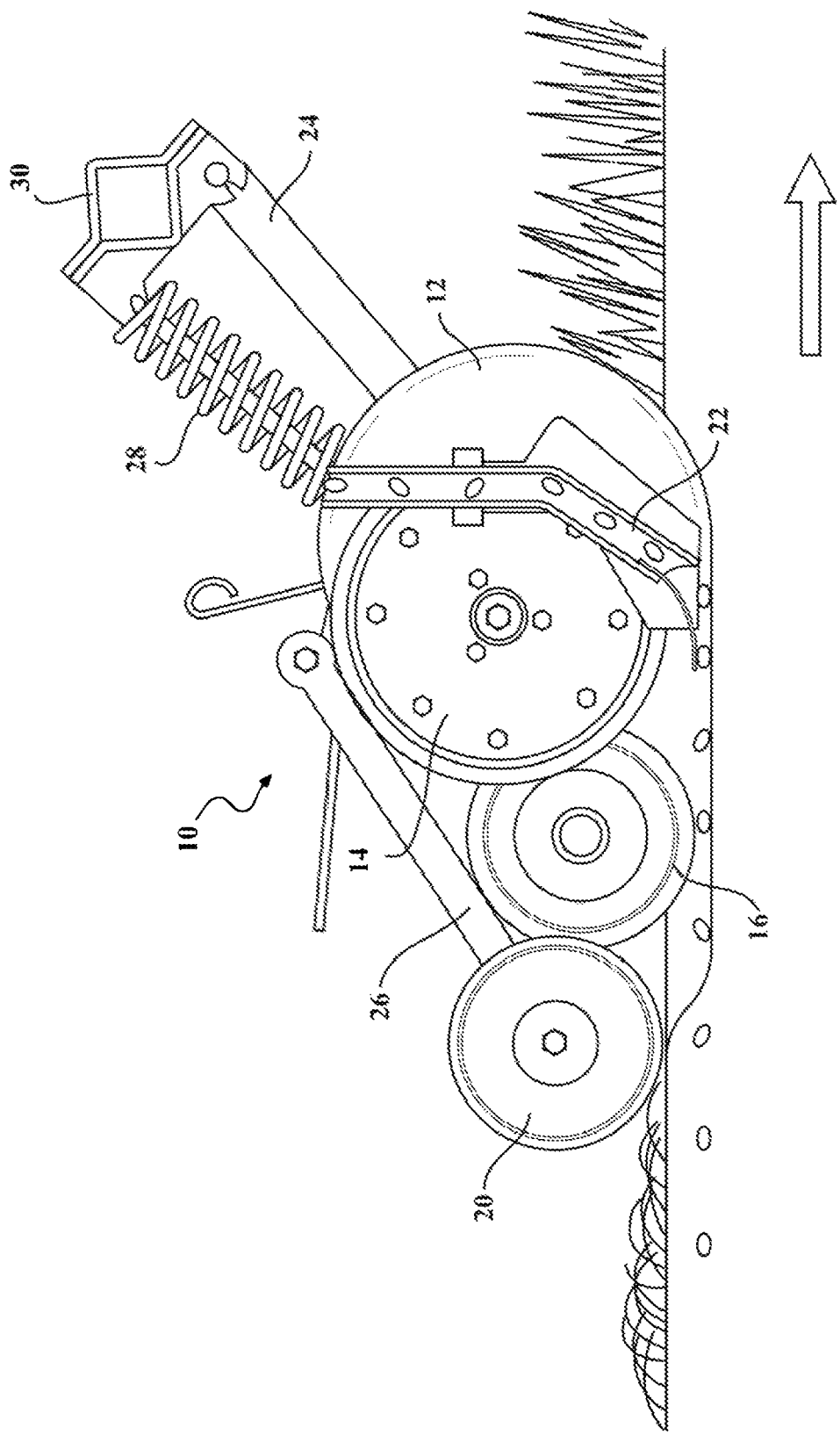
FIG. 1 is a side view of a seeder unit.

With reference to FIG. 1, a typical row seeder is shown at 10. This row seeder is a John Deere 1890 row seeder. It will be appreciated by those of ordinary skill in the art that the John Deere 1890 is only by way of illustration and that the row seeder 10 could be any seeder and in particular any type of no till seed. The seeder includes a disc opener 12, gauge wheel 14, press wheel 16 and a closing wheel 20. As is well known to those of ordinary skill in the art, the disc opener 12 creates a trench in the ground and the depth of that trench is determined by the gauge wheel. The press wheel presses down on the seeds that are being delivered by the seed tube 22, and the closing wheels 20 close the trench. The seeder is pivotably mounted by arms 24 and 26 to a tool bar 30 so that it is capable of movement over uneven terrain traversed by the agricultural implement.

Figure 2:
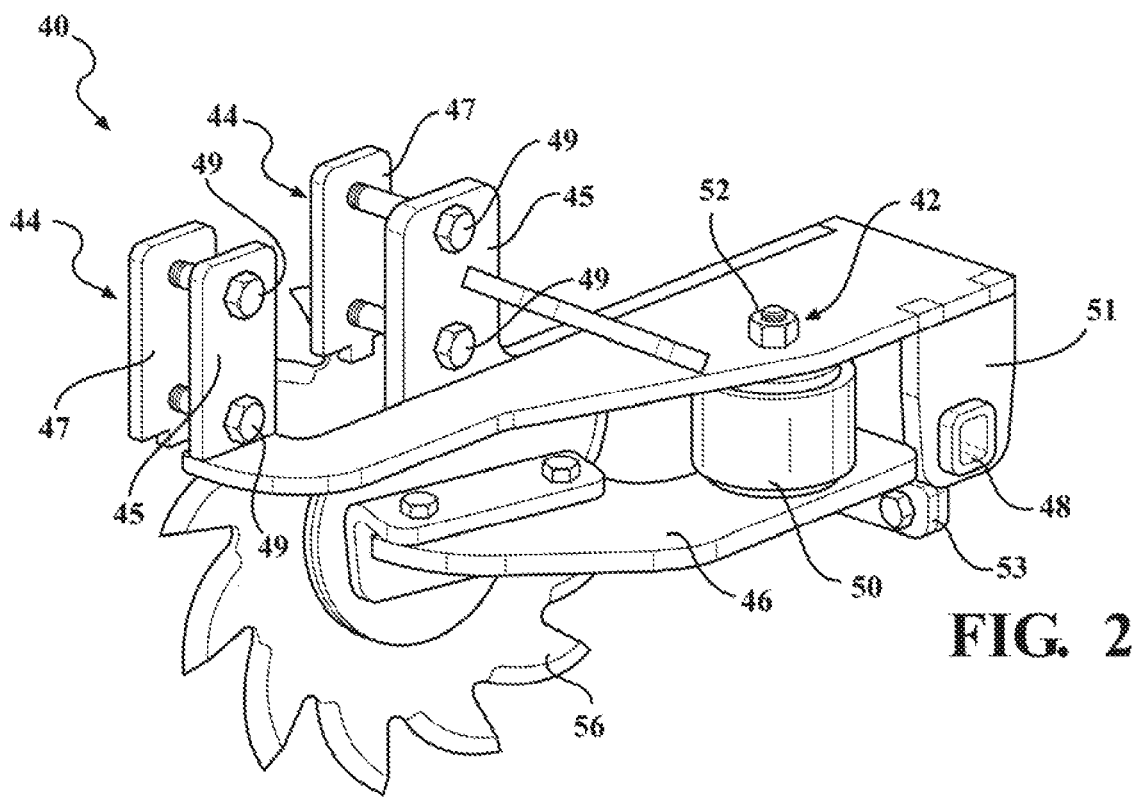
FIG. 2 is a perspective view of the row cleaner of the present invention in the raised position.
Figure 3:
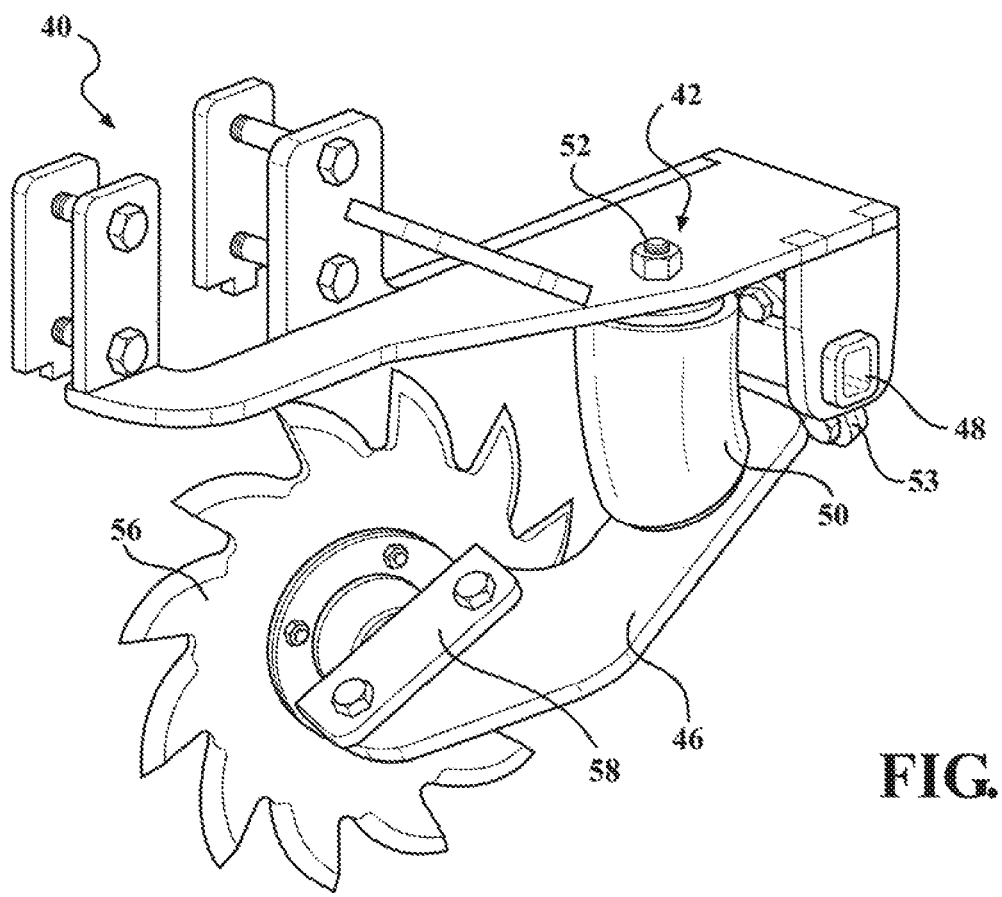
FIG. 3 is a perspective view of the row cleaner in the lowered position.
Figure 4:
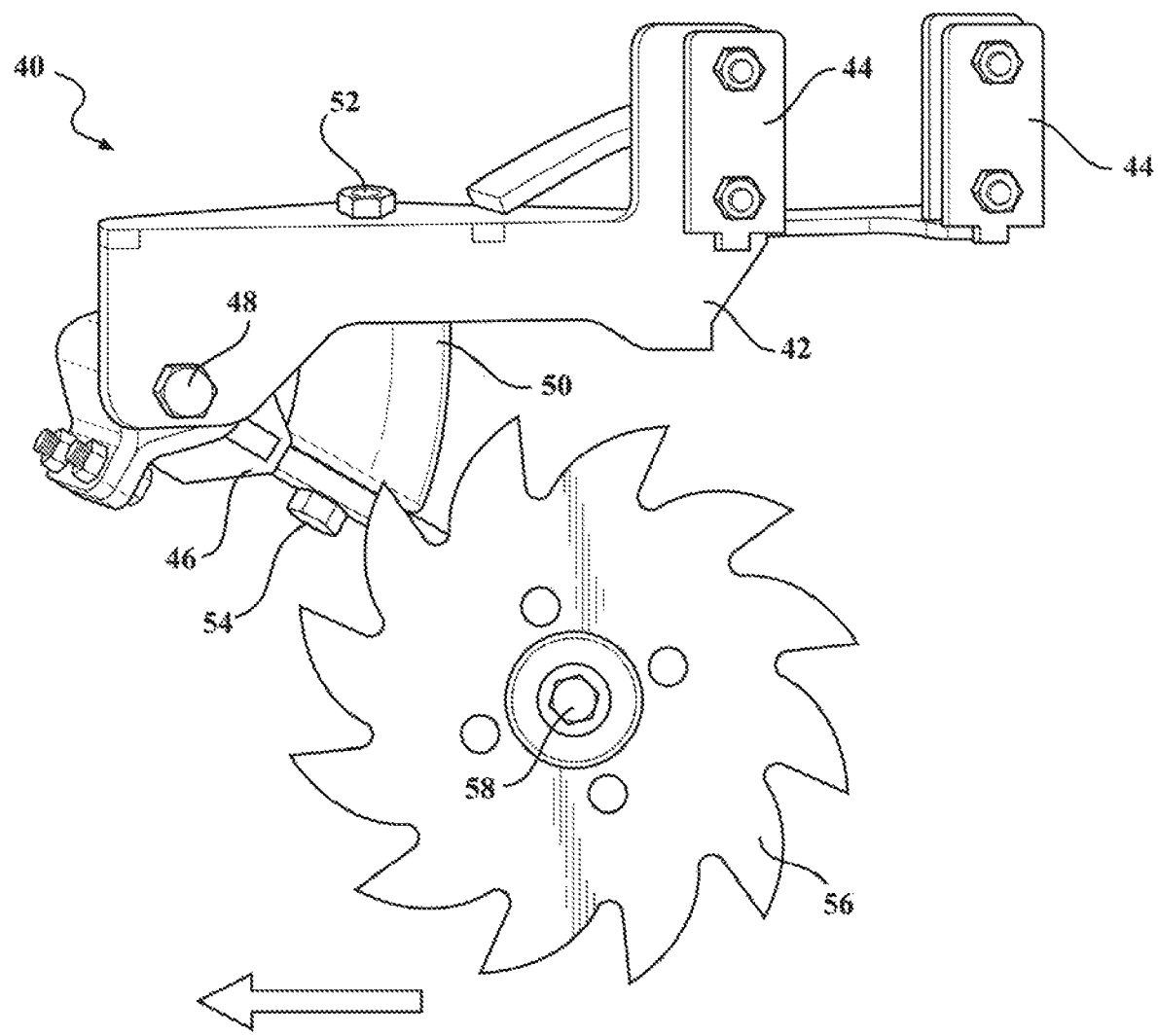
FIG. 4 is a side view of the row cleaner.
Figure 5:
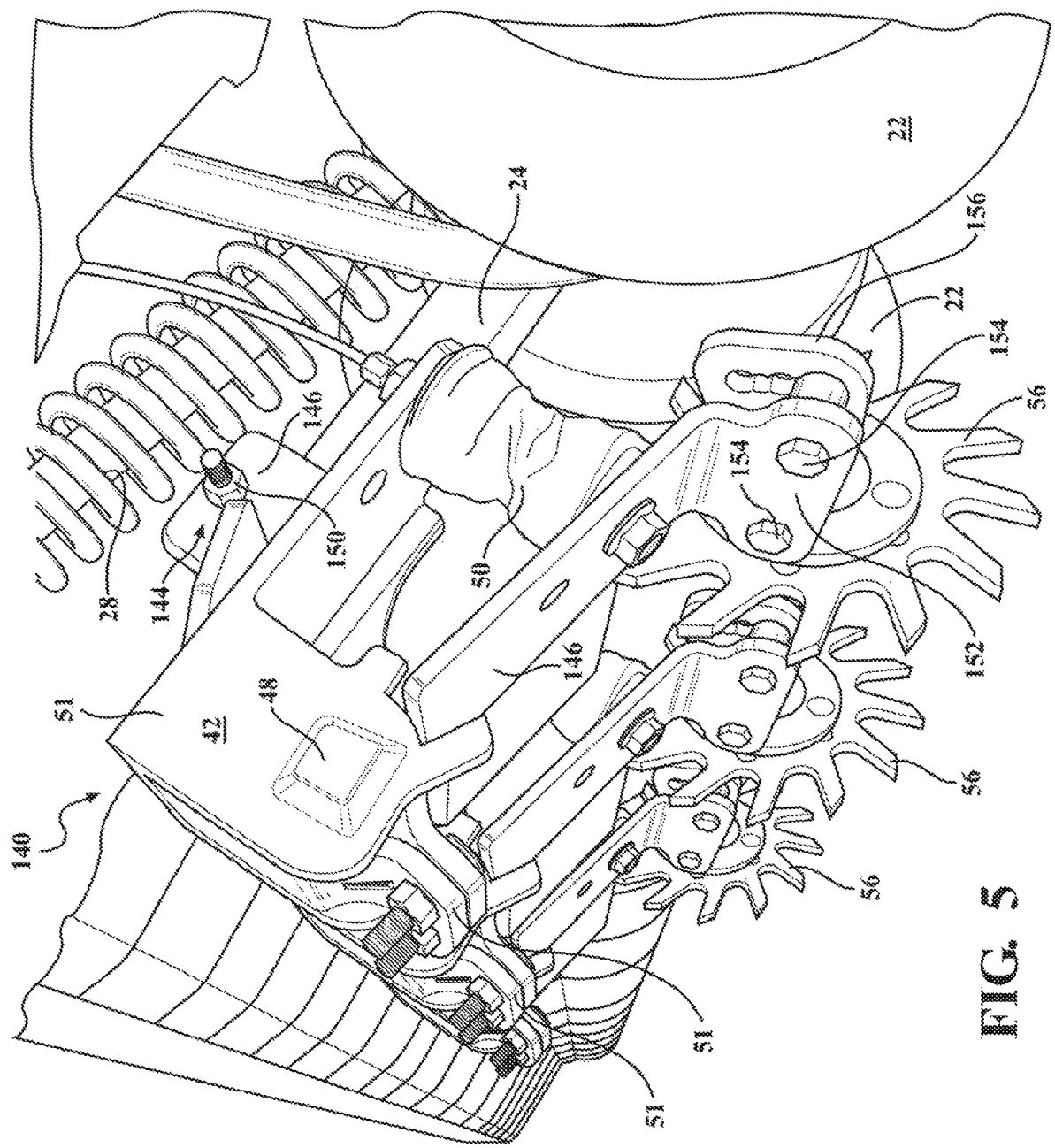
FIG. 5 is a partial perspective view of a further embodiment of the row cleaner of the present invention mounted to a seeder.

The crop residue row cleaning device of the present invention is shown generally at 40 in FIGS. 2 through 6. The row cleaning device 40 is mounted to either tool bar 30 or pivot arm 24 of the seeder 10. The illustration in FIG. 2 is a single row cleaning device. As will be understood by those of ordinary skill in the art, each seeder 10 on the implement would include a cleaning device 40. A series of row cleaners 140 of the second embodiment are illustrated in FIG. 5. Row cleaners 40 would be mounted in a similar fashion to either arm 24 or toolbar 30.

The row cleaning device 40 of the present invention has a main body 42 which is attached by mounting brackets 44 to the toolbar 30 or to the pivot arm 24. The mounting brackets 44 as illustrated have a pair of spaced mounting ears 45 that are generally perpendicular to the main body 42. Mounting plates 47 are attached to the ears 45 by fasteners 49. The mounting brackets 44 permit the cleaning device 40 to be mounted around the pivot arm 24 or toolbar 30 of the seeder 10.

A pivot leg 46 is pivotally mounted to the main body 42. A pivot 48 interconnects the pivot leg 46 to the connecting bracket 53 of the main body 42. The main body 42 has side members 51. The pivot 48 extends through these side members 51. As disclosed, the pivot 48 is shown as a torsional spring made of 60 durometer urethane. But, the torsional spring could also be made of rubber, plastic, or similar material that can twist. The torsional spring when twisted creates a bias to force the pivot leg 46 to the raised position.

A biasing member or control spring 50 extends between the pivot leg 46 and the main body 42. In the disclosed embodiment, the control spring 50 is a fluid spring or fluid shock, and more particularly an air spring or shock which is adjustable. The applicant has found an air spring manufactured by Continental under the brand name Conitech having part number SZ37-10 to work for its intended purpose, but those of ordinary skill in the art will appreciate that other air springs would work. As illustrated in FIG. 2, it is in its retracted position and in FIG. 3 it is shown in the extended position. The control spring 50 is connected by bolts 52 and 54 between the main body 42 and the pivoting leg 46.

The control spring 50 is shown as a fluid spring and more particularly an air spring, but could also be a hydraulic spring. The benefit of the fluid spring is that it doesn't have internal seals and metal tubes that can deteriorate in farming environments. The air spring is a bladder that contains fluid, such as air or hydraulic fluid. However, it should be appreciated that other biasing devices could be sued, such as for example a fluid cylinder, or a spring, similar to the spring 28, in FIG. 1. These are all adjustable. It will also be understood by those of ordinary skill in the art that the control spring 50 whether pneumatic or hydraulic could be remotely adjusted. This is an advantage of the present invention. The control spring 50 can be remotely operated from the tractor cab and can adjust the angle between the main body 42 and the pivot leg 46 to any desired angle. It should also be understood that the control spring 50 can be manually adjusted.

A clearing implement 56, is mounted to the pivot leg 46. The clearing implement 56 is illustrated as a wheel with cutting teeth. It should be understood that the clearing implement could take other forms such as a blade, a smooth wheel, a concave disc, etc. An axle 58 mounted on a bracket 59 connects wheel 56 to pivot leg 46 so that it is free to rotate as the clearing device 40 is driven through the planting area. As will be appreciated by those of ordinary skill in the art, only one wheel 56 is shown, but a second wheel 56 could also be used if desired.

With reference to FIGS. 1 and 4 and in particular the arrows shown in those figures, the direction of travel is in the direction of the arrows. As will be appreciated, clearing device 40 is a shown with the clearing implement 56 being pulled, i.e. it is a pull type device. As the seeder is pulled by a tractor, the clearing device 40 of FIGS. 2 through 4 will also be pulled in the same direction. Unlike other known devices, which have the wheel in front of the pivot point in the direction of travel, the present invention has the wheel 56 behind the pivot 48 in the direction of travel.

With the clearing device, which is illustrated as a wheel 56, behind the pivot 48, the wheel 56 is pulled. Because of the pivotal connection between pivot leg 46 and main body 42, any obstructions that are encountered will allow the pivot leg 46 to pivot vertically. The wheel 56 will not be forced into the ground since it is being pulled, but will roll over obstructions. Also, since the wheel 56 is being pulled, if an obstruction is encountered, the force of the impact drives the pulled wheel 56 and the pivot leg 46 in the counterclockwise direction, the same direction the wheel 56 is rotating. All forces acting upon the wheel 56 will rotate the wheel and allow the wheel to move vertically with respect to the seeder unit 10. Since the wheel 56 is being pulled, it cannot be pushed into the ground which results with existing row cleaners used on seeders.

Additionally, with the pivot point 48 being forward of the wheel 56, the wheel 56 is closer to the seed drop. Because of it being closer, there is less likelihood of the residue from the clearing implement 56 entering the seed trench. As is well known to those of ordinary skill in the art, residue in the seed trench can cause hair penning which results in bad emergence. With the clearing implement 56 being closer to the blade 12 of the seeding tool and the seed drop 22, there is much less likelihood of residue entering the trench.

In the preferred embodiment, the pivot 48 of the present invention includes a torsional spring. It will be understood by those of ordinary skill in the art that other types of biasing devices could be used, such as for example, a coil spring wrapped around a pivot shaft, a spring, such as a coil spring or fluid spring mounted between the main body 42 and the pivot leg 46, etc. The purpose of the bias is to normally bias the pivot leg 46 to the raised position. The torsional spring 48 forces the leg 46 to the raised position as shown in FIG. 3. The spring 50, when extended, as shown in FIG. 3, forces the leg 46 to the desired lowered position. This is infinitely adjustable between the raised and lowered positions and can be controlled from within the cab of the tractor.

The spring 50 is extended by supplying pressurized fluid to the spring 50. This biases the pivot 48 which exerts a spring bias on leg 46. When the pressure on the spring 50 is released, the torsional spring in pivot 48 biases the leg 46 to the fully raised position. In other words, with no pressure on the leg 46, the leg 46 returns to the raised position or remains in the raised position. This is particularly advantageous over prior art row cleaners. With the row cleaner 40 of the present invention, the operator can release the air, or hydraulic fluid to the spring 50 and the leg 46 snaps back to the raised position due to the normal bias of the pivot 48. This creates a row cleaner that can be raised and lowered rapidly from the cab of the tractor. When the operator wants the cleaner raised, the air or hydraulic fluid pressure is released, snapping the clearing implement 56 to the fully raised position shown in FIG. 3. When the operator wants the clearing implement 56 lowered, pressure is supplied to the air cylinder 50 and the clearing implement 56 is lowered to the desired location.

The control spring 50 also avoids the disadvantage of using an air cylinder to keep the clearing implement 56 in the lowered position. The air spring 50 is not susceptible to contamination and due to the torsional spring 48 and spring 50, the reaction is immediate.

Figure 6:
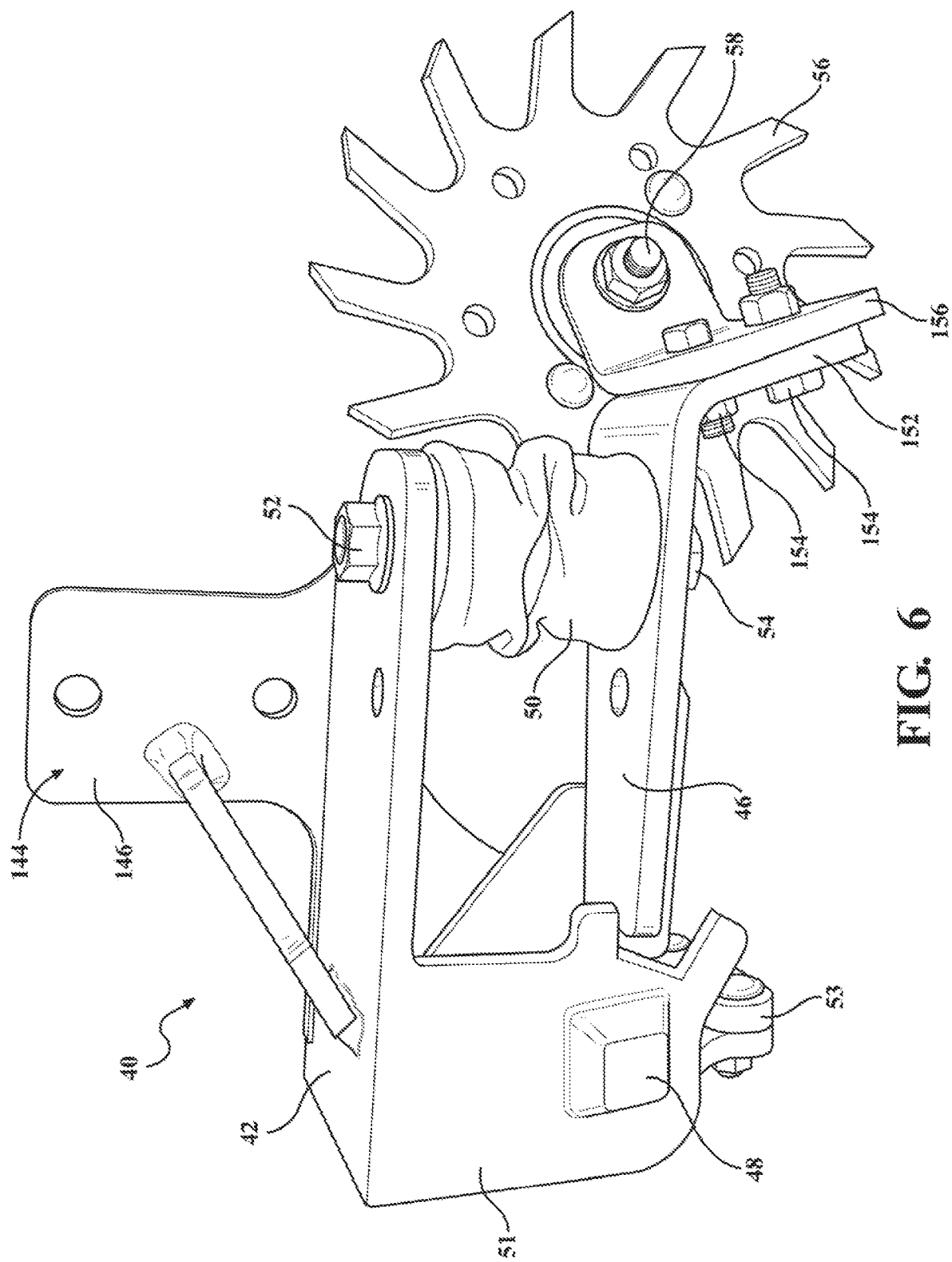
FIG. 6 is a side view of the row cleaner of FIG. 5.

With reference to FIGS. 5 and 6, a further embodiment of the row cleaner 140 is illustrated. Elements similar to the elements of the previous embodiment has been designated with the same reference numbers.

The row cleaner 140 has a mount 144. Mount 144 is a single ear 146 to which is attached a single plate (not shown) by fasteners 150. The pivot leg 46 also includes a downwardly extending clearing implement section 152 to which the clearing implement 56 is bolted by fasteners 154. The clearing implement has an attachment bracket 156. The fasteners 154 also allow for adjusting the pitch, angle, and camber of the cleaning wheel 156.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A row cleaning device comprising:
   a main body having a proximal end and a distal end, said main body proximal end being adapted to mount to a seeder;
   a pivot leg having a first end and a second end;
   a single pivot defining a pivot axis, said single pivot interconnecting said pivot leg first end to said main body distal end, said second end extends toward said main body proximal end;
   a clearing implement is mounted to said pivot leg second end;
   said row cleaning device is adapted to be driven by a seeder in a direction of travel;
   said clearing implement being located behind said pivot in said direction of travel;
   said pivot leg pivots with respect to said main body about said single pivot as said clearing implement moves along the ground in said direction of travel.

2. The row cleaning device of claim 1, further including a mounting bracket attached to said main body.

3. The row cleaning device of claim 2, wherein said mounting bracket has at least one mounting ear extending perpendicular to said main body, and at least one mounting plate, said at least one mounting plate being positioned adjacent said mounting ear, and at least one fastener to connect said mounting plate to said at least one mounting ear for mounting said row cleaner to a seeder.

4. The row cleaning device of claim 2, wherein said mounting bracket is adapted to mount to said pivot arm of said seeder or to the mounting bar of said seeder.

5. The row cleaning device of claim 1, further including a first spring, said pivot leg has a raised position and a lowered position, said first spring normally maintaining said pivot leg in said raised position.

6. The row cleaning device of claim 1, further including a second spring mounted between said main body and said pivot leg to force said pivot leg between a raised position and a lowered position.

7. The row cleaning device of claim 6, wherein said control spring is adapted to drive said pivot leg to said lowered position.

8. The row cleaning device of claim 7, wherein said first spring normally biases said pivot leg in said raised position.

9. The row cleaning device of claim 8, wherein said second spring acts against said first spring to force said pivot leg to said lowered position, whereby said pivot leg returns to said raised position when said second spring is released.

10. The row cleaning device of claim 6, wherein said second spring is a fluid spring that extends when pressurized and retracts when depressurized, said second spring acts against the bias of said first spring to force said pivot leg to said lowered position when pressurized; said first forces said pivot leg to said raised position when said second spring is depressurized.

11. The row cleaning device of claim 6, wherein said second spring is remotely controlled.

12. The row cleaning device of claim 6, wherein said second spring pivots said pivot leg at different angles with respect to said main body to set different lowered positions of said pivot leg to adjust the position of said clearing implement with respect to the ground.

13. The row cleaning device of claim 6, wherein said second spring is pneumatic.

14. The row cleaning device of claim 6, wherein said second spring is hydraulic.

15. The row cleaning device of claim 1, wherein said clearing implement has a plurality of cutting teeth.

16. The row cleaning device of claim 1, wherein said single pivot includes a torsional spring to bias said pivot leg to said raised position.

17. The row cleaning device of claim 16, further including a mounting bracket attached to said main body.

18. The row cleaning device of claim 17, wherein said mounting bracket has at least one mounting ear extending perpendicular to said main body, and at least one mounting plate, said at least one mounting plate being positioned adjacent said mounting ear, and at least one fastener to connect said mounting plate to said at least one mounting ear for mounting said row cleaner to a seeder.

19. The row cleaning device of claim 17, wherein said mounting bracket is adapted to mount to said pivot arm of said seeder or to the mounting bar of said seeder.

20. A row cleaning device comprising:
   a main body having a proximal end and a distal end, said main body proximal end being adapted to mount to a seeder;
   a pivot leg having a first end and a second end, said first end being pivotally mounted to said main body distal end at a pivot, said second end extending toward said main body proximal end, said pivot having a pivot spring to normally bias said pivot leg to said raise position;
   a control spring mounted between said main body and said pivot leg to force said pivot leg between a raised position and a lowered position, said control spring acts against said pivot spring to force said pivot leg to said lower position;

a clearing implement mounted to said pivot leg second end;

said row cleaning device being adapted to be driven by a seeder in a direction of travel;

said clearing implement being located behind said pivot in said direction of travel;

said pivot leg pivots with respect to said main body as said clearing implement moves along the ground in said direction of travel.

21. The row cleaning device of claim 20, wherein said pivot spring is a torsional spring, and said pivot leg has a raised position and a lowered position, said torsional spring normally maintaining said pivot leg in said raised position.

22. The row cleaning device of claim 21, wherein said control spring acts against said torsional spring to force said pivot leg to said lowered position, whereby said pivot leg returns to said raised position when said control spring is released.

23. The row cleaning device of claim 20, wherein said control spring is a fluid spring that extends when pressurized and retracts when depressurized, said control spring acts against said pivot to force said pivot leg to said lowered position when pressurized; said pivot forces said pivot leg to said raised position when said control spring is depressurized.

24. The row cleaning device of claim 20, wherein said control spring is remotely controlled.

25. The row cleaning device of claim 20, wherein said control spring pivots said pivot leg at different angles with respect to said main body to set different lowered positions of said pivot leg to adjust the position of said clearing implement with respect to the ground.

26. The row cleaning device of claim 20, wherein said control spring is pneumatic.

27. The row cleaning device of claim 20, wherein said control spring is hydraulic.

28. The row cleaning device of claim 20, wherein said clearing implement has a plurality of cutting teeth.

* * * * *